US008122468B2

(12) United States Patent
Begeja et al.

(10) Patent No.: US 8,122,468 B2
(45) Date of Patent: Feb. 21, 2012

(54) SYSTEM AND METHOD FOR DYNAMICALLY CONSTRUCTING AUDIO IN A VIDEO PROGRAM

(75) Inventors: Lee Begeja, Gillette, NJ (US); David C. Gibbon, Lincroft, NJ (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 588 days.

(21) Appl. No.: 12/267,283

(22) Filed: Nov. 7, 2008

(65) Prior Publication Data

US 2010/0122285 A1    May 13, 2010

(51) Int. Cl.
| | |
|---|---|
| H04N 7/10 | (2006.01) |
| G06Q 30/00 | (2006.01) |
| G06F 3/00 | (2006.01) |
| G06F 3/16 | (2006.01) |
| G11B 27/00 | (2006.01) |
| H04N 5/92 | (2006.01) |

(52) U.S. Cl. ............... 725/34; 705/14.49; 705/14.53; 705/14.66; 705/14.67; 705/14.69; 715/716; 715/719; 715/724; 715/727; 386/287; 386/338; 386/339

(58) Field of Classification Search ............ 725/34, 725/32; 705/14.49, 14.53, 14.66, 14.67, 705/14.69; 715/716, 719, 724, 727; 386/287, 386/338, 339
See application file for complete search history.

(56) References Cited

U.S. PATENT DOCUMENTS

| | | | |
|---|---|---|---|
| 6,177,931 B1 | 1/2001 | Alexander et al. | |
| 6,446,261 B1 | 9/2002 | Rosser | |
| 6,698,020 B1 | 2/2004 | Zigmond et al. | |
| 7,231,651 B2 | 6/2007 | Pong | |
| 7,631,330 B1 | 12/2009 | Des Jardins | |
| 7,650,617 B2 | 1/2010 | Hoshino et al. | |
| 7,721,307 B2 | 5/2010 | Hendricks et al. | |
| 2002/0066026 A1 | 5/2002 | Yau et al. | |
| 2002/0116313 A1* | 8/2002 | Detering | 705/37 |
| 2003/0061206 A1* | 3/2003 | Qian | 707/3 |
| 2004/0261096 A1 | 12/2004 | Matz | |
| 2007/0061838 A1 | 3/2007 | Grubbs et al. | |
| 2007/0157228 A1 | 7/2007 | Bayer et al. | |
| 2008/0127252 A1 | 5/2008 | Eldering et al. | |
| 2009/0310932 A1* | 12/2009 | Hsieh et al. | 386/55 |
| 2010/0058381 A1 | 3/2010 | Begeja et al. | |
| 2010/0122286 A1 | 5/2010 | Begeja et al. | |
| 2010/0242063 A1 | 9/2010 | Slaney et al. | |
| 2010/0275221 A1* | 10/2010 | DuVall et al. | 719/328 |

* cited by examiner

*Primary Examiner* — Hoang-Vu A Nguyen-Ba

(57) ABSTRACT

Disclosed herein are systems, methods, and computer readable-media for dynamically constructing audio in a video program. The method includes extracting video metadata from a video program displayed on a playback device to a viewer, extracting component metadata from a plurality of audio components stored in a media object library, extracting viewer preferences from a viewer profile, receiving synchronization information about the video program, identifying a segment of the video program susceptible to inserting an audio component based on extracted video metadata, component metadata, and viewer preferences, transmitting the audio component to the playback device and a set of instructions detailing how to insert the audio component in real time in the segment of the video program, and constructing audio in the video program at the playback device using the audio component and the set of instructions.

20 Claims, 7 Drawing Sheets

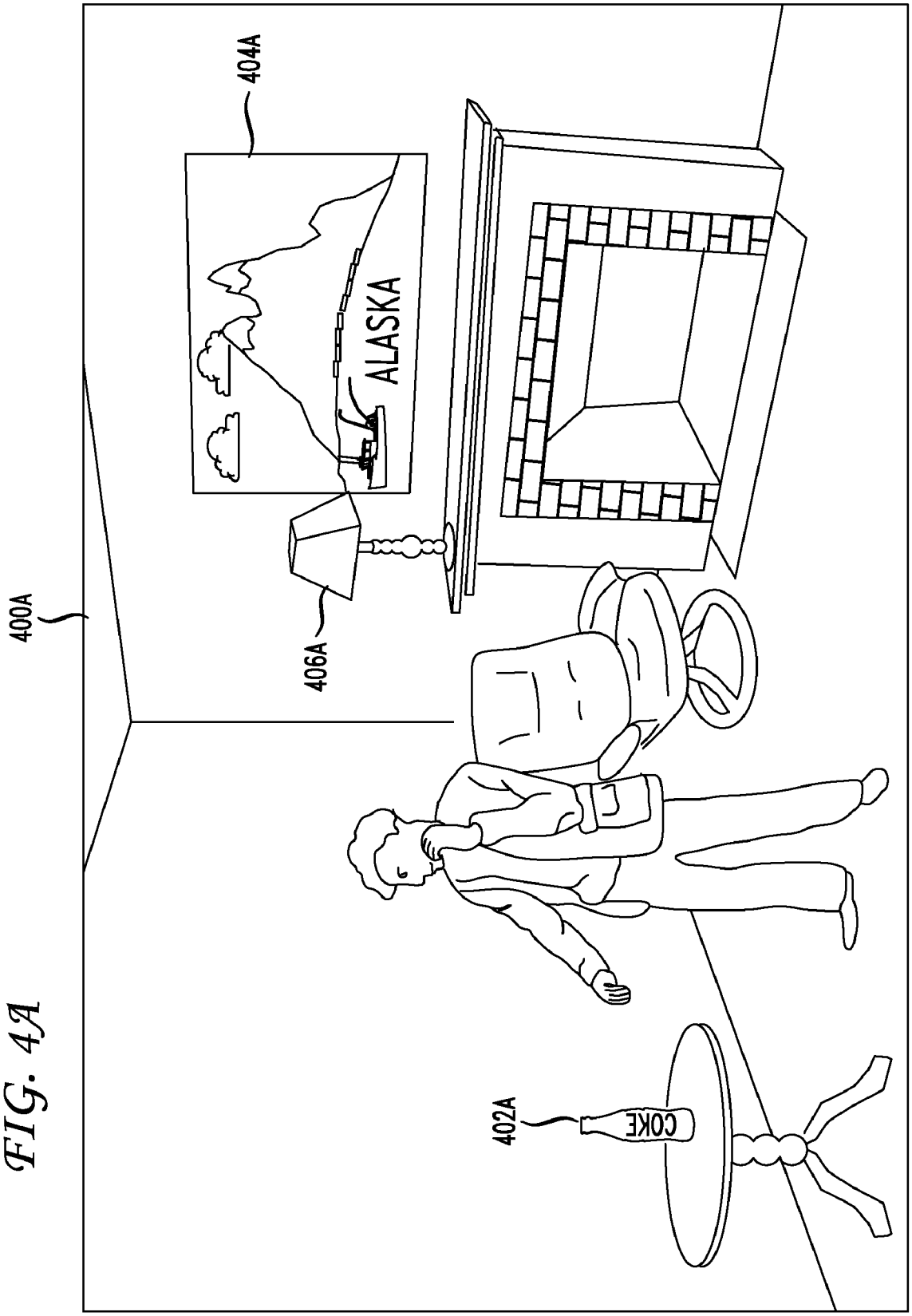

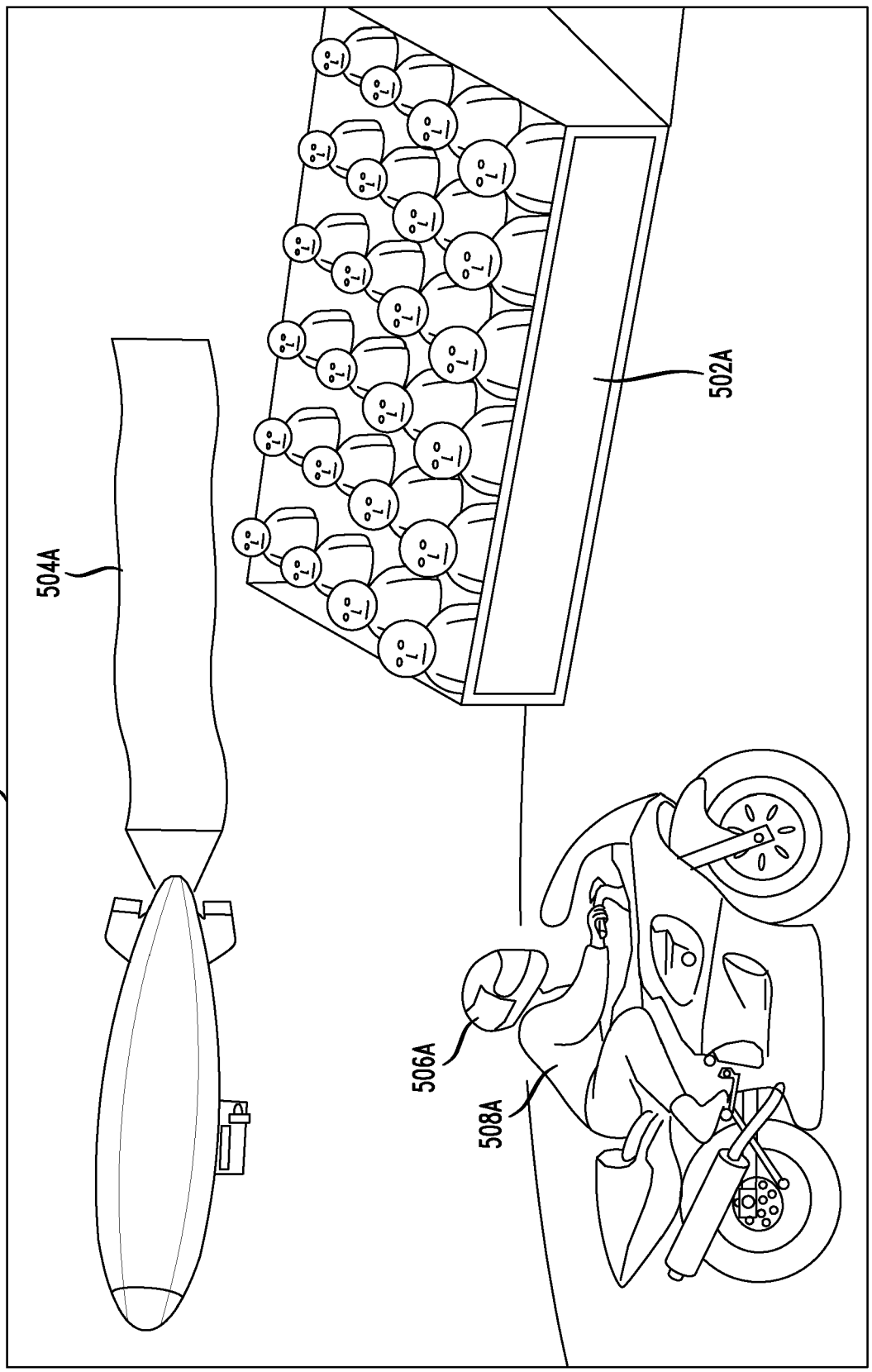

SYSTEM AND METHOD FOR DYNAMICALLY CONSTRUCTING AUDIO IN A VIDEO PROGRAM

CROSS-REFERENCE TO RELATED APPLICATION

This application relates to application Ser. No. 12/204,265 titled "Methods and Apparatus for Dynamic Construction of Personalized Content" filed Sep. 4, 2008 and application Ser. No. 12/267,284 titled "System and Method for Dynamically Constructing Personalized Contextual Video Programs" filed Nov. 7, 2008. The contents of these applications are herein incorporated by reference.

BACKGROUND OF THE INVENTION

1. Field of the Invention

The present invention relates to video processing and more specifically to dynamic personalized audio in contextual video programs.

2. Introduction

For decades television networks have divided television content along clearly marked boundaries: advertisements and television shows. Television networks broadcast a show interrupted by series of advertisements. Typically these advertisements follow strict time constraints of 15, 30, or 60 seconds, but some variations have been and are currently used. In the past, soap operas incorporated advertisements into the show by having actors sing or speak advertising text during the usual program. Infomercials appear to be a television show, but are really a show-length, paid advertisement disguised as a television show. While some variations are used and have been experimented with in the past, the time-tested pattern of "show, ad break, show, ad break" is followed by nearly every television channel in some form or another.

With the advent of digital video recorders (DVR) such as TiVo, television viewers are able to record, timeshift, pause live television, fast forward, and, most importantly, easily skip traditional advertisements in recorded television. While these abilities are heralded as a great boon by television viewers, advertisers are less optimistic because viewers can skip advertisements at will. With fewer viewers, advertisements are less effective, which causes problems for advertisers. With less effective advertisements and fewer viewers, television networks cannot charge advertisers as much for commercial air time.

To respond to the problem of skipping advertisements, advertisers and television networks are turning to more embedded approaches in addition to traditional advertisements. For example, television networks promote other television shows in graphics and videos superimposed over a portion of the screen, like a scrolling station identifier, a picture of Homer Simpson's head, and text saying "Simpsons are coming up next at 7:30, only on FOX 21." Such advertisements are typically relegated to a corner or edge of the screen and are usually unrelated to the primary television show. These sorts of advertisements and promotional information are commonplace now and are difficult or impossible to remove from the viewer's sight by means of a DVR. However viewers are increasingly desensitized to these unrelated, superimposed video objects and pay less and less attention to them. Further, these video objects are frequently annoying, disrupt the show, and can obscure important parts of the screen. These overlaid advertisements are broadcast to each viewer and are not tailored to the interests and demographic of each viewer. Advertisers and television networks are constantly searching for new ways to advertise so that viewers pay attention and respond to advertising. Television networks can replace video segments with advertising, but then the accompanying audio does not always match.

Additionally, these known approaches to advertising are not personalized or targeted to each viewer. Advertising in this untargeted way is inefficient. As new video objects are replaced and laid over existing content, audio may not match. For example, if a soda-pop bottle replaces a can in a video clip, the associated sound does not match when the can/bottle is opened. The discord that arises from the mismatch detracts from the effect of the replacement. Accordingly, what is needed in the art is an improved way to smoothly blend targeted advertisements with audio content.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable-media for dynamically constructing audio in a personalized contextual video program. The method includes extracting video metadata from a video program displayed on a playback device to a viewer, extracting component metadata from a plurality of audio components stored in a media object library, extracting viewer preferences from a viewer profile, receiving synchronization information about the video program, identifying a segment of the video program susceptible to inserting an audio component, based on extracted video metadata, component metadata, and viewer preferences, and transmitting the audio component to the playback device and a set of instructions detailing how to insert the audio component in real time in the segment of the video program. Video metadata can be extracted in real time. A viewer profile can be based on demographic information and a log of user behavior. The video program and the audio component can be combined before transmitting the video component and the set of instructions to the playback device. An audio component can be selected based on which advertiser offers to pay the most. The transmitted audio component and set of instructions can be stored as a construction list for future use.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4A illustrates a first unmodified television scene;

FIG. 5A illustrates a second unmodified video game prepared for use with dynamically constructed personalized contextual advertisements.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
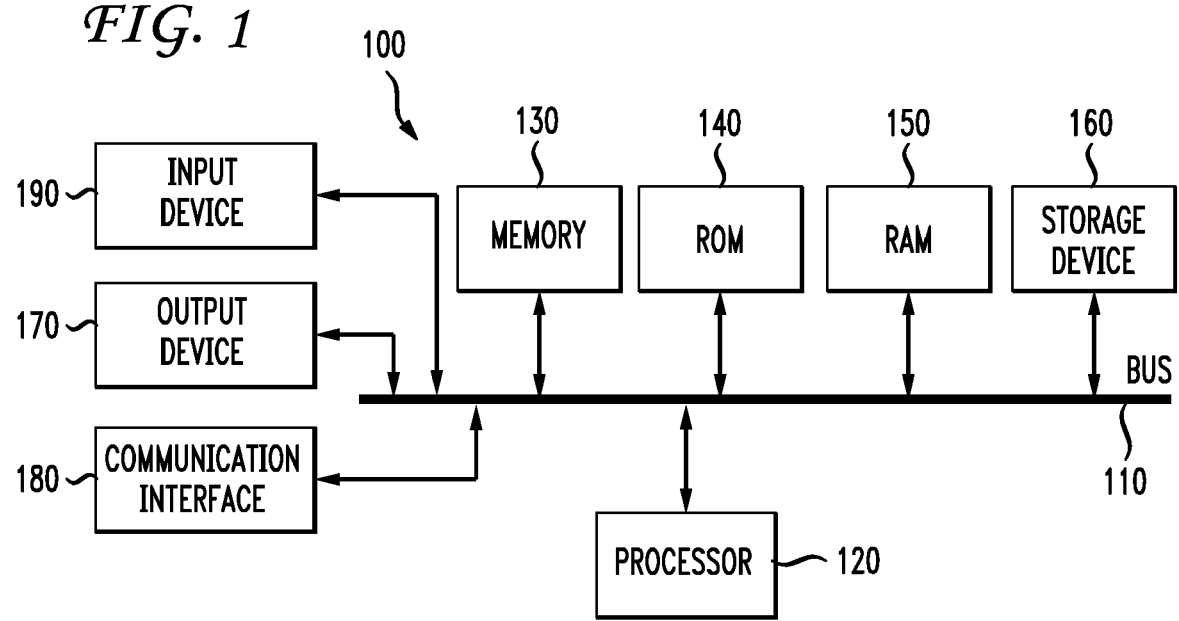
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

With these basic principles in mind, the disclosure turns to the method embodiment. The method embodiment is discussed in terms of a system which performs the steps of the method. The system may be a portable device, a server, a desktop computer, a video game console, etc. Although the principles described herein may be applied successfully to advertising content and many of the examples given relate to advertisements, the invention is not limited to inserting advertising content and may be extended to construct any personalized contextual audio in combination with video.

Figure 2:
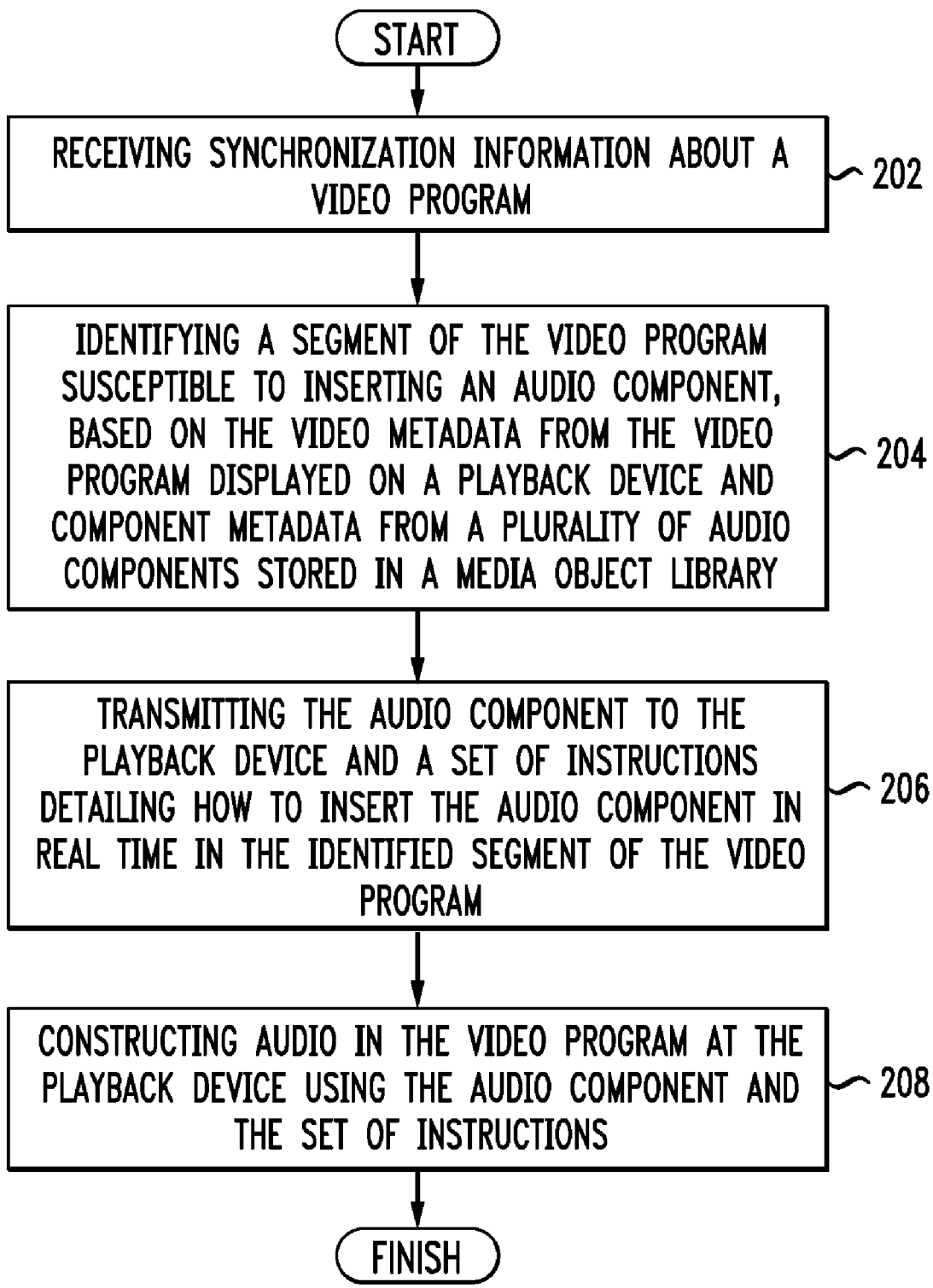
FIG. 2 illustrates an example method embodiment.

One of the objectives of the method is to blur the line between ads, inserted video content, and inserted audio content by dynamically merging contextual, personalized advertising into the video itself rather than playing advertising alongside a video, during designated commercial breaks, or overlaying an unrelated advertisement over a fixed portion of the screen. FIG. 2 illustrates an example method embodiment. The system receives synchronization information about the video program (202). For example, if a server is communicating with a video playback device, the playback device sends information to the server such as which video is playing, the current playback position, which video metadata apply to the current playback position, etc. The playback device can tell the server the rate of playback (i.e. is the video paused, rewinding, being fast-forwarded and at what speed).

Then the system identifies a segment of the video program susceptible to inserting an audio component, based on the video metadata from the video program displayed on a playback device and component metadata from a plurality of audio components stored in a media object library (204). The system can identify a segment of the video program down to fractions of a second. For example, a television show depicts the protagonist driving in a brand new Mercedes. The segment can be each scene where the Mercedes makes a sound. In conjunction with dynamic, contextual personalized audio component insertion, if the Mercedes is replaced with an old, beat-up 1960s Ford with tail fins, the engine, horn, doors, etc. will sound different. In this aspect, audio insertion will often go hand in hand with video insertion to ensure that sounds align with and make sense in light of inserted video components.

Instead of thinking of a television broadcast or DVD as a work that is permanent and fixed, the audio becomes more malleable. The system can alter the audio in numerous ways for different viewers. The principles described herein can be applied to targeted, personalized non-advertising purposes as well. The principles described herein can also be applied to radio, cassette tapes, MP3 players, PDAs, smart phones, live television broadcasts, IPTV, DVDs, VHS tapes, streamed online video, home videos, video games, portable media players, GPS displays, movie theaters, electronic information kiosks, etc.

Because this technique is likely to be used by television or cable networks, the system can assign higher priority to advertising components of an advertiser who offers or bids more money. This element of the technique as applied to advertising can be called the Z-depth. The system can allow for bids on a wholesale scale to be shown to many millions of viewers or on a more targeted scale where each user receives only ads that are directly relevant to her. A middle ground somewhere between these two extremes or a blend of the two is much more likely in implementation.

The system can extract video metadata from a video program displayed on a playback device to a viewer. The system can process video metadata in advance and store it either in the video program itself or in a separate file. The system can extract video metadata from the video in real time by processing the video and analyzing the video contents during playback. As video processing technology develops, the system can initiate video metadata analysis when playback is started and can finish the analysis before the end of the video, essentially extracting metadata faster than playback. In this variation, the system caches video metadata until it is needed. Video metadata is a very expansive term that includes textual information such as closed captions, phone numbers, objects in a scene, a transcript of the spoken dialog, embedded URLs, commercial break locations, background information such as a plot summary, location information, the era of the film, actors present in a specific scene, angles, specific objects in the film, which demographic groups the video may appeal to, and generally any information about the content of the video.

The system can extract video metadata from sources external to the video itself, such as reviews from rottentomatoes.com or director and producer information from imdb.com. Video metadata is the first source of data out of three which inform audio selections in personalized dynamic contextual video programs.

The system can extract component metadata from a plurality of audio components stored in a media object library. Audio components include audio clips, text, theme music, jingles, sound effects, pitches, volumes, phoneme libraries, etc. A text-to-speech module can generate audio components on the fly. Audio components may be parts of advertisements. Audio advertising components are any audible sub-part of advertising. For example, a Coca-Cola® video advertisement can be broken down into audio sub-parts such as the Coca-Cola® theme music, the sound of a bottle opening, an endorser's voice, an announcer's voice, a collection of phonemes of a voice which can be used to construct speech in that voice, and other sound effects. The system can store a media object library centrally or distributed across several locations. Advertisers can synthetically generate advertising components, record them from video clips or animated cartoons, etc. Advertising components are essentially the ingredients used in making advertisements. Advertisers can provide these components to the system for use as audio in dynamic personalized contextual advertisements.

The system can use a phoneme library tailored specifically to advertising components. Such a phoneme library can be very small and optimized specifically to coordinate with the system replacing certain video components. For instance, the system can use a customized phoneme library to produce speech of the product name, slogan, descriptive words and phrases, marketing words and phrases, etc.

A content provider such as a broadcast or cable television network can provide a library of stock sounds for use by advertisers. In one aspect, the content provider charges a fee in advance or in real time for using the library of stock sounds. Similarly, advertisers can share their own audio components with others. In such a scenario, advertisers can designate certain audio components as available for sharing and others as unavailable. Advertisers can charge a fee for allowing others to use their audio components. In one aspect, the audio component is purchasable, such as an MP3 or a ringtone. The system inserts the purchasable audio component into the video and presents an option to the viewer to purchase the inserted purchasable audio component. The system can present the option to purchase the audio component on the main video display, on a remote control, on a laptop, cellular phone, etc. In a similar vein, the system can incorporate purchased items into video programs of people with interests and profiles similar to the purchaser's interests and profile.

The system associates each advertising component with metadata describing the component, usage information, which advertiser to use it with, billing information, placement information, target demographic, etc. Audio component metadata is a second source of data to inform audio selections in personalized dynamic contextual video programs. The system can extract viewer preferences from a viewer profile. The system can implicitly create contents of a viewer profile by observing viewer behavior, or can explicitly create a viewer profile by asking a viewer to fill out a survey. A viewer profile can contain demographic information and/or a log of user behavior. Viewer preferences can also include a log of which advertisements are equated with purchases to give some kind of indication which advertisements or products are of interest to the viewer. Viewer preferences are a third source of data to inform audio selections in personalized dynamic contextual video programs.

Next, the system transmits the audio component to the playback device and a set of instructions detailing how to insert the audio component in real time in the segment of the video program (206). Instructions can include a markup language or other common language to describe when and how to place audio components. For example, the instructions can include volume, pitch, duration, and timing information. In the case of video with multiple audio channels, such as simple stereo sound as well as more complicated Dolby Surround Sound® or DTS Digital Surround®, the instructions can include channel blending and balancing information. In one embodiment, a set top box attaches to a television which receives and processes transmitted audio components and instructions. The set top box inserts the audio component into the video and displays it to a user. In another embodiment, a remote server performs the insertion and broadcasts it to a television set over the air or over a cable television network. In the case of streaming video over the Internet, some combination of both can be applied. The system can store transmitted audio components and sets of instructions as a construction list for future use. When a certain combination is likely to occur over and over, a construction list can recreate the combination with minimal difficulty. A display list is one analogous technology in the OpenGL programming language.

The system optionally ranks segments by prominence and visibility in the video program and assigns a price to each segment based on the ranking. The price can be a static price or it can be a minimum price if advertisers bid on advertising spots. Many different payment models can be applied to charge advertisers. Advertisers can be charged a flat rate, by the impression, by the viewer, etc. The system can track different audio segments and determine if they are loud, quiet, completely audible, partially audible, in an environment with a lot of competing audio or not, distorted, etc. A prominence ranking allows for some indication of how likely effectiveness of an inserted advertisement. An advertiser can be charged more for a clear, unobstructed impression of an advertising component than for a quite placement in a loud environment, for example. Advertisers or a television network can set a threshold using the ranking structure to prefer more prominent placements, for example.

Advertisers can establish guidelines governing the usage and placement of their advertising components. For example, Coca Cola may have a policy that their product placements are not to occur alongside or within 10 minutes of their competitors. So the system implements a usage guideline disallowing competitors like Pepsi or RC-Cola from inserting their advertising components 10 minutes before or after those of Coca Cola. Disney may establish a guideline that no Disney products are to be advertised in the same video as "adult" advertisements. Advertisers may establish a usage guideline outlining a legally required obligation, such as a regulation prohibiting tobacco companies from targeting children. A university football team can establish a guideline that their school song is played only when the university colors make up at least 25% of an associated video display. These and other guidelines regarding usage and placement are possible.

Further, the system optionally receives feedback based on viewer/listener behavior and generates a behavior model for the viewer/listener based on the received feedback. Feedback includes user interaction with the television, remote control, video/audio playback device, etc. Feedback includes purchases of advertised goods or services. Feedback can be based on almost any viewer behavior and/or interaction. The system can represent aggregated behavior information about one viewer in a viewer behavior model. The system can generate viewer behavioral models on a personal level, small group level, or demographic level. The behavior model allows for more targeted advertising that is continuously refined and updated as new behavior patterns emerge and evolve. If a viewer responds positively to advertisements accompanied by classical music, then the system can insert advertising components containing or relating to classical music into the video program or combine classical music with existing advertising components.

In one variation, a viewer profile classifies a viewer as an impulsive purchaser, a purchaser who meticulously researches every purchase, or somewhere in between. Based on the classification, the system selects advertising components from the media object library with different levels of advertising detail. The system can categorize, assign, and sort advertising components by level of detail to facilitate this variation. For example, a very low detail audio clip is "End of the year car sale at XYZ Chevrolet this weekend", a medium detail audio clip is "End of the year car sale at XYZ Chevrolet this Saturday and Sunday showcasing the 2010 Chevrolet Corvette for only $499 a month!", and a high detail audio clip can provide even more details about a particular car, the particular sale, driving directions from the listener's house, etc. One of skill in the art will recognize many variations involving user feedback and behavior models.

The described method is also applicable to three dimensional environments such as video games or virtual worlds. In addition to replacing existing in-game objects, the system can select a different personalized, contextual audio component for each player or participant individually. For example, the player's virtual character honks his vehicle's horn and one player hears "Fly Like an Eagle" and another player hears "La Cucaracha". As the system replaces objects, the system also replaces sounds to coordinate and match the audio with the replaced objects. The system can be a central server which communicates with each player's computer or the system can be each individual computer. The prominence of audible advertising spaces in a dynamic three dimensional environment is subject to change, so the pricing for each spot is subject to change as well. In one variation on personalized, contextual advertising in video games, the system confers a benefit such as discounted pricing, in-game performance boosts, better odds of finding desirable in-game objects, etc. to characters for opting to make advertising sounds with their virtual character on a one-time basis or as part of the character's usual actions.

The system constructs audio in the video program at the playback device using the audio component and the set of instructions (208). The system or the playback device follows the set of instructions, such as remove audio from the video between times 3:49 and 4:04, replacing the audio with the provided audio component. Instructions can include information about volume, crescendo, decrescendo, sound channel, whether to replace or supplement the original audio, etc. The system for constructing audio in the video program can operate in conjunction with dynamic personalized video replacement. For example, as the system replaces original video content with advertising or other video components, the same or a companion system replaces the original audio with new audio that corresponds to the replacement video components.

Figure 3:
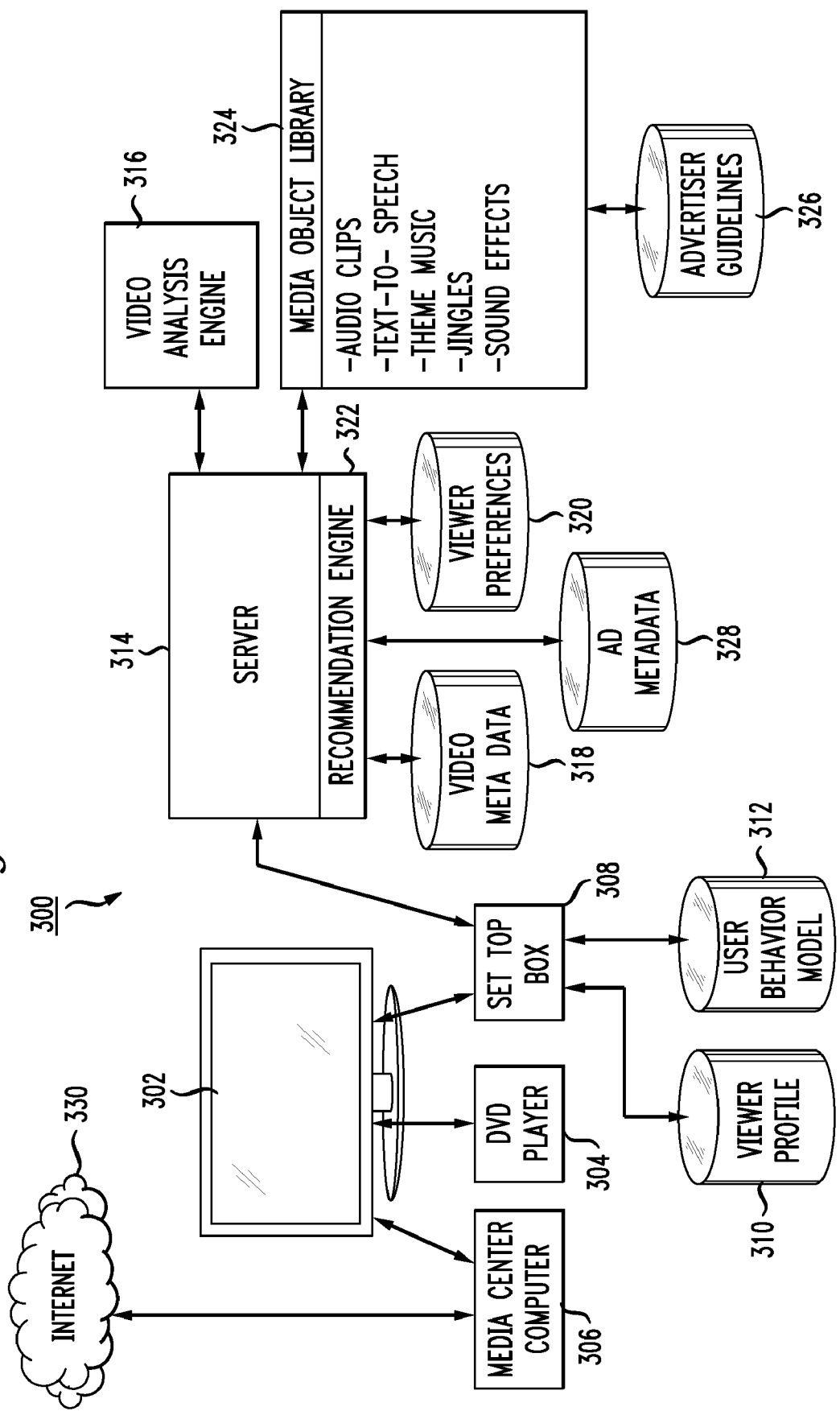
FIG. 3 illustrates a sample system to dynamically construct audio in personalized contextual video.

FIG. 3 illustrates a sample system to dynamically construct personalized contextual advertisements. The system 300 revolves around a display device 302 such as a television, computer monitor, portable media player, smart phone, etc. A television is shown, but virtually any display device can be substituted. The television 302 is connected to multiple input devices such as a DVD player 304, a media center computer 306 connected to the Internet 330, and a set-top box 308. The system can insert audio into video playback on any such device. The set-top box 308 can store a viewer profile 310 and a user behavior model 312. In this illustration, only the set-top box 308 is connected to the server 314, but any of the playback devices 304, 306, 308 or the television 302 itself can connect to the server. The connection can be a cable television network, the Internet, 802.11x, Ethernet, or some combination. The server 314 and other components shown can be wholly or partially integrated into the playback devices or the television.

When the server 314 receives video, it passes the video through a video analysis engine 316 such as the Miracle Video Search Engine from AT&T Labs. The video analysis engine 316 provides video metadata 318 to the server. The video metadata 318 describes the content of the video. The server stores ad metadata 328 describing available advertising components in the media object library 324. Advertisers can provide metadata describing advertising components or the server can analyze and generate ad metadata with minimal advertiser assistance or completely without advertiser assistance. The server 314 also stores viewer preferences 320 which can be based on a usage/interaction log, on a viewer profile 310, on a user behavior model 312, and/or other sources.

With these three primary sources of information, video metadata 318, ad metadata 328, and viewer preferences 320, the recommendation engine 322 determines which segments of the video are susceptible to inserting audio components. The recommendation engine 322 retrieves the appropriate advertising components from the media object library 324, packages them with instructions detailing how to insert them in the video, and sends that package through the server 314 to the set-top box 308. The set-top box then follows the instructions to insert the advertising component into the appropriate video segment. One concrete example of the end result is the server replaces a trumpet of a character in a television show with a saxophone based on viewer preferences. The sound for the saxophone does not match the replaced trumpet's sound, so the system retrieves a sample sound for a saxophone. The system retrieves a set of pitches representing an advertising jingle. The system prepares instructions detailing how to reproduce the advertising jingle using the sample sound for the saxophone and sends the instructions, the jingle, and the saxophone sound to the set-top box 308 which follows the instructions to assemble the correct audio and inserts it in the appropriate place. The set-top box can contain individual settings to allow or disallow specific instructions or to filter specific types of instructions. The set-top box 308 and server 314 can be aware of which viewers are present and attempt to select advertising components that best coincide with the preferences, interests, and tendencies of all viewers, where possible.

Further, as discussed above, advertisers can establish guidelines 326 to govern usage of audio advertising components, including how and when. Advertiser guidelines can apply per advertiser, per advertising component, per product line, etc. Some example advertiser guidelines are "play the Intel jingle only in science and technology related video segments", "never play the AT&T jingle in close temporal proximity with indicia of any other telecommunications providers", and "preferably play the My Little Pony Fruit Snacks song in Saturday morning cartoons to girls ages 2-7". Although advertiser guidelines 326 are shown as connected with the media object library 324, advertiser guidelines can be connected in other places or distributed in several places, such as the server 314 or the set-top box 308. The system can provide a direct interface, such as a web page, for advertisers to log in and change their guidelines. Advertisers can use the same or similar interface to upload advertising components to the media object library 324. Advertisers can also upload complete objects to the library and identify portions of each object to separate out into advertising components. For example, an advertiser uploads a video clip. The advertiser can separate out the entire audio track, individual clips, sound effects, voices, etc. as separate audio advertising components. The system can use each component in different ways. In some cases, the system uses an entire object instead of just the components. For example, in a movie which includes a television set in the background, the system can adjust an entire advertising video clip for insertion over the screen of the television set in the background, including audio of the video clip at an appropriate volume and played in the appropriate Surround Sound channel. The system may reduce the volume of the audio so as not to overpower the sound effects and dialog in the video program.

Figure 4B:
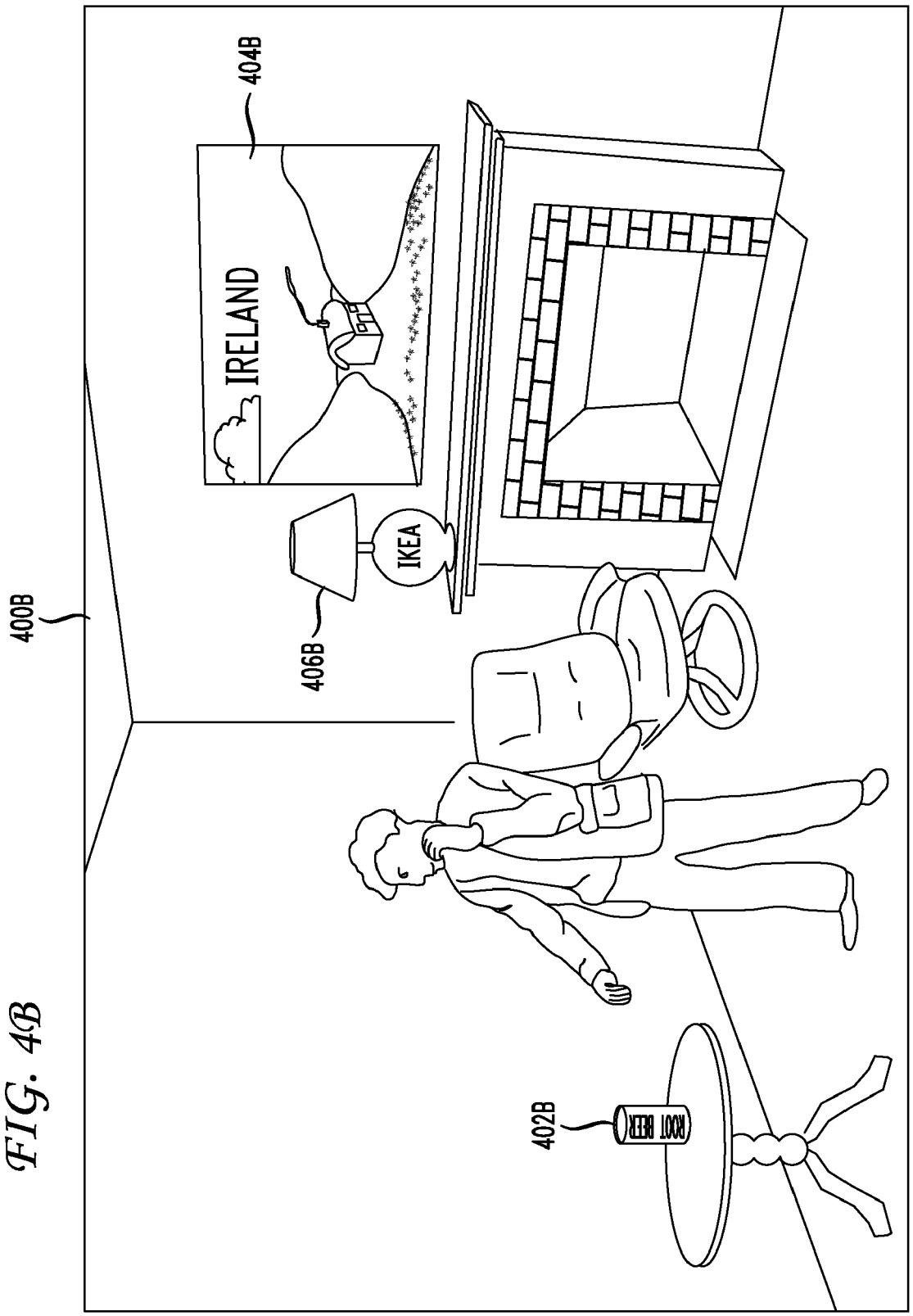
FIG. 4B illustrates the same television scene modified with personalized contextual advertisements.

FIG. 4A illustrates an unmodified television scene 400A. In this scene, a coke bottle 402A is shown on the table, a picture of Alaska 404A is on the wall, and a certain type of lamp 406A is on the mantle. FIG. 4B illustrates the same television scene modified with dynamic personalized contextual advertisements 400B. The system modified this scene based on user preferences, available advertising components, etc. A root beer can 402B replaces the coke bottle 402A on the table. As an actor in the television show opens the can instead of the bottle, the system changes the sound to correspond to the modification. A root beer distributor can purchase ad time like this. A promotional poster for Ireland 404B replaces the picture of Alaska 404A. The system replaces or augments the background soundtrack with music and sound effects more reminiscent of Ireland and traditional or popular Irish music. A European travel agency can purchase such ad time to promote travel and tourism in Ireland. In another example, the system replaces a can of Country Time Lemonade® with a can of Mountain Dew Code Red®. The target demographic of each is wildly different. In this example, the system replaces soothing classical background music associated with the Lemonade with a more edgy, rock-and-roll type music better suited to Mountain Dew. One variation "splits the difference" between the two and selects background music that is somewhat appropriate for both the replaced item and the replacing item. An IKEA brand lamp 406B replaces the original lamp 406A. As the user refers to the lamp in conversation, the system generates and inserts or generates the phrase "IKEA lamp" in the voice of the speaker over the word "lamp".

Figure 5B:
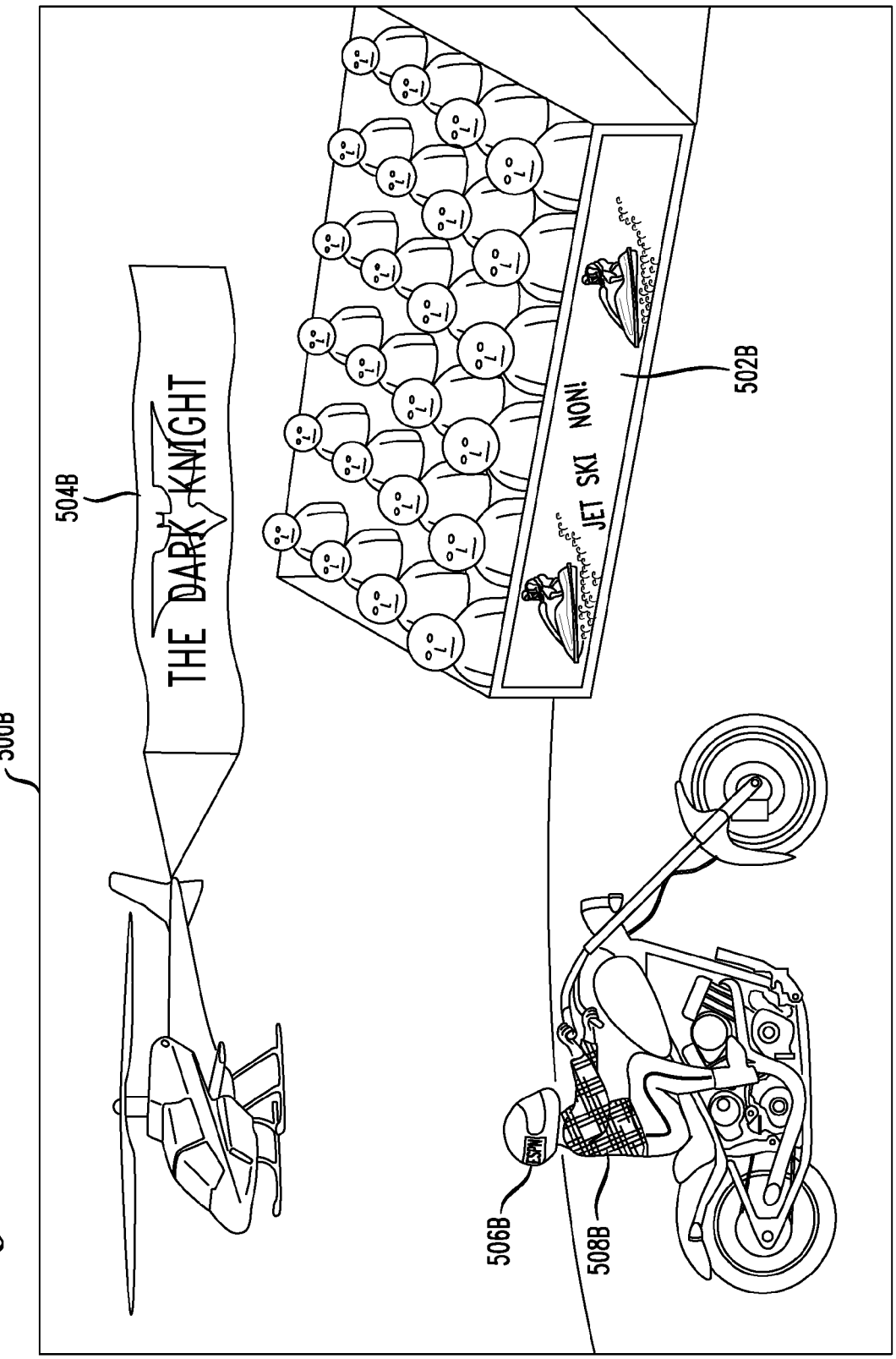
FIG. 5B illustrates the same video game including personalized contextual advertisements.

FIG. 5A illustrates an unmodified video game prepared for use with dynamically constructed personalized contextual advertisements. As video game consoles increase in complexity, all or part of the system can be incorporated into consoles. Video games can also encompass computer games and games on portable devices. Due to the digital nature of video game output, the system can require that advertisers provide advertising audio components in digital form for use with video games or in a form easily convertible to digital. The scene 500A depicts bleachers 502A containing an audience, a banner 504A pulled by a blimp, and a player wearing a helmet 506A and a jacket 508A. FIG. 5B illustrates the same video game including personalized contextual advertisements. Developers of the video game left each of these segments in the video game blank intentionally for the purpose of dynamically inserting personalized contextual video advertisements in-game. As a user plays the game, the system identifies advertising components that match the user's profile and inserts them in appropriate places and times. The system can store advertising components on the video game console or retrieve them from a remote location, such as a server on the Internet. The system can replace all or part of the blank segments, although for illustration purposes, all of the blank segments are filled in for FIG. 5B. Each replaced video segment does not necessarily require an accompanying replaced audio component, but often changing video and audio in tandem enhances the experience for a viewer or player.

FIG. 5B depicts a scene 500B where the system has replaced blank segments with personalized contextual advertisements. The system selects each advertisement based on a user profile. The system can also take in to account other factors to influence the type of advertising components to insert, such as the type of video game, the time of day, or current events/products. The system places an advertisement for Jet Skis on the bleachers 502B. The system can accompany the Jet Ski advertisement with a sound track from a Jet Ski commercial. The system alters the movie advertisement for The Dark Knight 504B on the banner so that it tracks the movement and waving of the banner for a realistic look in-game. The system can accompany the inserted banner by inserting chatters from the crowd in the bleachers discussing the movie. The system also replaces the blimp with a helicopter. To accompany this change, the system replaces the soft, soothing hum of the blimp with the sound of a helicopter flying overhead in an appropriate sound channel. Another example is wrapping the ESPN logo 506B around the rear side of the user's helmet. The system can play the ESPN network identification chime during cut scenes in the game and simultaneously send an offer to the viewer's cell phone to purchase the chime as a ringtone. When players race in the video game simultaneously, each user sees and hears different things. While one player sees and hears about ESPN, other players can see and hear entirely different dynamic, personalized audio and video advertising components tailored to his or her individual profile. The system changes the player's motorcycle from a speed bike to a muscle bike. One appropriate sound change is to insert a deep Harley-Davidson® style growl instead of the high-pitched motor of the speed bike. As another example of what can constitute an advertising component, the system changes the racer's jacket from smooth to flannel texture 508B. This is one example of a video change that does not necessarily require or lend itself to updated, inserted audio.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to nearly any audiovisual display. Those skilled in the art will readily recognize various modifications and changes that may be made to the present invention without following the example embodiments and applications illustrated and described herein, and without departing from the true spirit and scope of the present invention.

We claim:

1. A method comprising:
 receiving synchronization information associated with a video program;
 identifying a segment of the video program susceptible to inserting an audio component, based on video metadata from the video program displayed on a playback device and component metadata associated with a plurality of audio components stored in a media object library;
 transmitting the audio component to the playback device and a set of instructions detailing how to insert the audio component in real time in the segment; and
 constructing audio in the video program at the playback device based on the audio component and the set of instructions.

2. The method of claim 1, wherein identifying the segment is based at least in part on viewer preferences.

3. The method of claim 1, wherein the video metadata is extracted in real time.

4. The method of claim 1, wherein a viewer profile is based on demographic information and a log of user behavior.

5. The method of claim 1, further comprising:
 combining the video program and the audio component before transmitting the audio component and the set of instructions to the playback device.

6. The method of claim 1, wherein constructing the audio is done in conjunction with dynamic personalized video replacement.

7. The method of claim 1, further comprising:
storing the audio component and set of instructions as a construction list for future use.

8. The method of claim 1, further comprising:
ranking segments by prominence and audibility in the video program; and
assigning a price to each of the segments based on the ranking.

9. The method of claim 1, wherein an advertiser establishes guidelines governing usage and placement of audio components associated with the advertiser.

10. The method of claim 1, further comprising:
receiving feedback based on viewer behavior; and
generating a behavior model for the viewer based on the feedback.

11. A system comprising:
a processor;
a first module configured to control the processor to receive synchronization information associated with a video program;
a second module configured to control the processor to identify a segment of the video program susceptible to inserting an audio component, based on video metadata from the video program displayed on a playback device and component metadata associated with a plurality of audio components stored in a media object library;
a third module configured to control the processor to transmit the audio component to the playback device and a set of instructions detailing how to insert the audio component in real time in the segment; and
a fourth module configured to control the processor to construct audio in the video program at the playback device based on the audio component and the set of instructions.

12. The system of claim 11, wherein identifying the segment is based at least in part on viewer preferences.

13. The system of claim 11, wherein the video metadata is extracted in real time.

14. The system of claim 11, wherein a viewer profile is based on demographic information and a log of user behavior.

15. The system of claim 11, further comprising a fifth module configured to control the processor to combine the video program and the audio component before transmitting the video component and the set of instructions to the playback device.

16. A non-transitory computer-readable medium storing a computer program having instructions for controlling a computing device to perform steps comprising:
receiving synchronization information associated with a video program;
identifying a segment of the video program susceptible to inserting an audio component, based on video metadata from the video program displayed on a playback device and component metadata associated with a plurality of audio components stored in a media object library;
transmitting the audio component to the playback device and a set of instructions detailing how to insert the audio component in real time in the segment; and
constructing audio in the video program at the playback device based on the audio component and the set of instructions.

17. The non-transitory computer-readable medium of claim 16, wherein identifying the segment is based at least in part on viewer preferences.

18. The non-transitory computer-readable medium of claim 16, wherein the video metadata is extracted in real time.

19. The non-transitory computer-readable medium of claim 16, wherein a viewer profile is based on demographic information and a log of user behavior.

20. The non-transitory computer-readable medium of claim 16, the instructions further comprising combining the video program and the audio component before transmitting the audio component and the set of instructions to the playback device.

* * * * *

UNITED STATES PATENT AND TRADEMARK OFFICE
CERTIFICATE OF CORRECTION

PATENT NO. : 8,122,468 B2  
APPLICATION NO. : 12/267283  
DATED : February 21, 2012  
INVENTOR(S) : Begeja et al.

It is certified that error appears in the above-identified patent and that said Letters Patent is hereby corrected as shown below:

In the Claims

Column 12, line 50, Claim 1, "transmitting the audio component to the playback device" should be changed to --transmitting to the playback device the audio component--.

Column 13, line 14, Claim 10, "the viewer" should be changed to --a viewer--.

Signed and Sealed this
Eighteenth Day of February, 2014

Michelle K. Lee
*Deputy Director of the United States Patent and Trademark Office*